US009729952B2

(12) United States Patent
Ivey et al.

(10) Patent No.: US 9,729,952 B2
(45) Date of Patent: Aug. 8, 2017

(54) FLIP OUT DOG LEG MOUNTABLE CEILING SPEAKER ENCLOSURE

(71) Applicant: Mitek Corp., Inc., Phoenix, AZ (US)

(72) Inventors: Johnathan Ivey, Chandler, AZ (US); Michael Schomisch, Mesa, AZ (US); Kevin Sykes, Tempe, AZ (US); Michael Douglass Howell, Ennis, TX (US)

(73) Assignee: MITEK CORP., INC., Phoenix, AZ (US)

( * ) Notice: Subject to any disclaimer, the term of this patent is extended or adjusted under 35 U.S.C. 154(b) by 113 days.

(21) Appl. No.: 14/737,352

(22) Filed: Jun. 11, 2015

(65) Prior Publication Data

US 2016/0366501 A1 Dec. 15, 2016

(51) Int. Cl.
*H04R 1/02* (2006.01)
*F16M 13/02* (2006.01)

(52) U.S. Cl.
CPC .......... *H04R 1/026* (2013.01); *F16M 13/027* (2013.01); *H04R 2201/021* (2013.01)

(58) Field of Classification Search
CPC . H04R 1/026; H04R 2201/021; F16M 13/027
USPC .......................................................... 381/395
See application file for complete search history.

(56) References Cited

U.S. PATENT DOCUMENTS

| | | | | |
|---|---|---|---|---|
| 7,780,135 B2 * | 8/2010 | Nelson | .................. | H04R 1/025 181/150 |
| 8,148,634 B1 * | 4/2012 | Gretz | .................... | H02G 3/123 174/481 |
| 8,286,749 B2 | 10/2012 | Stewart, Jr. et al. | | |
| 2007/0121988 A1 * | 5/2007 | Merrey | ................. | H04R 1/025 381/386 |
| 2013/0327587 A1 * | 12/2013 | Yoshida | ................ | H04R 1/026 181/199 |

* cited by examiner

*Primary Examiner* — Duc Nguyen
*Assistant Examiner* — Sean H Nguyen
(74) *Attorney, Agent, or Firm* — Keith L. Jenkins, Registered Patent Attorney LLC; Keith L. Jenkins

(57) ABSTRACT

An improved manually operated flip dog mountable ceiling speaker enclosure, for ceiling or other panel installation, has a biased sliding ratchet block that can be latched in place by an extension from a T-handle of an integral actuator rod. The ratchet block is controlled in its sliding motion by alignment rods extending from a vertical portion of a base and slidingly received in alignment bores of the ratchet block. A face of the ratchet block has downward pointing ratchet teeth that engage upward pointing ratchet teeth on a barrel of a flip dog to hold the flip dog in a clamped position. Over time, the biasing springs may lose their strength, but the latching of the ratchet block obviates this problem.

20 Claims, 19 Drawing Sheets

100
102
112
116
A

FLIP OUT DOG LEG MOUNTABLE CEILING SPEAKER ENCLOSURE

TECHNICAL FIELD

This invention relates to providing an improved flip out dog leg mountable ceiling speaker enclosure. In particular, this invention relates to providing a manually installable flip out dog leg mountable ceiling speaker that is an improvement over the one described and claimed in US Pre-grant Publication US 20140305734 A1.

BACKGROUND

Installation of loudspeakers into panels, especially ceiling panels, presents unique challenges, especially in obtaining the desired balance between speed of installation and security of installation. Significantly, ceiling speaker installation in larger buildings can involve a thousand or more ceiling speakers, and the time it takes to install one ceiling speaker, multiplied a thousand times, becomes a noticeable factor in labor costs. A general class of devices used for ceiling speaker installation are "flip out dog legs" which clamp, or dog, a peripheral portion of ceiling panel between an annular flange and at least two dogs which are mounted peripherally around the speaker enclosure. Flip out dog legs are also known as "flip dogs". Flip dogs are initially stowed within the outer circumference of the hole in the ceiling panel in which the loudspeaker enclosure is to be mounted. In conventional operation, a screw device is used to "flip" the dog into a radially aligned position and lower the dog to the clamping position, requiring a screw driver for installation, usually a powered screw driver.

U.S. Pat. No. 8,286,749 discloses flip dogs that are screw-driven to deployment and combine the lowering action with the downward travel of the dog. Dismounting can be achieved by reversing the screw to exploit a vertical spring bias. U.S. Pat. No. 7,780,135 discloses screw-driven, vertical spring biased flip dogs of a different design, but similar functionality. US published patent application 20070121988 discloses yet another design for screw-driven, vertically spring-biased dogs.

US Pre-grant Publication US 20140305734 A1 made a step forward by creating a flip dog that did not need a tool for activation and taught a reed spring for a biasing mechanism for biasing the ratchet teeth between the flip dog and a supporting wall for the flip dog. Subsequent investigation has found that the spring may fatigue over time, resulting in undesirable disengagement of the flip dogs.

Therefore, a need exists for a flip dog mountable ceiling speaker enclosure that does not require tools for activating the flip dogs. In addition, there is a need for a flip dog mountable ceiling speaker enclosure that does not depend on the long-term viability of a biasing mechanism. In addition, there is a need for a flip dog mountable ceiling speaker enclosure that can be more rapidly installed. There is also a need for a flip dog mountable ceiling speaker enclosure that can be fitted with a speaker by the user. There is also a need for a flip dog mountable ceiling speaker enclosure that can be dismounted. There is also a need for a flip dog mountable ceiling speaker enclosure in which all flip dogs on the flip dog mountable ceiling speaker enclosure can be deployed simultaneously.

OBJECTS AND FEATURES OF THE INVENTION

A primary object and feature of the present invention is to overcome the above-mentioned problems and fulfill the above-mentioned needs.

Another object and feature of the present invention is to provide a system that does not require tools for activating the flip dogs.

It is a further object and feature of the present invention to provide a flip dog mountable ceiling speaker enclosure that does not depend on the long-term viability of a biasing mechanism.

It is a further object and feature of the present invention to provide a system that can be more rapidly installed.

It is a further object and feature of the present invention to provide a system that can be dismounted.

It is a further object and feature of the present invention that it can be provided as a mountable enclosure to be fitted with a user's speaker.

It is a further object and feature of the present invention to provide a flip dog mountable ceiling speaker enclosure in which all flip dogs on the flip dog mountable ceiling speaker can be deployed simultaneously.

It is an additional primary object and feature of the present invention to provide such a system that is efficient, inexpensive and handy. Other objects and features of this invention will become apparent with reference to the following descriptions.

SUMMARY OF THE INVENTION

Hereinafter, the term "speakers" is used to mean "audio loudspeakers". The apparatus of the present invention provides a flip dog mountable speaker enclosure, with or without one or more speakers, that is installed rapidly and manually without tools, by providing an integrated actuator, such as a retainable T-handled pull rod. The system comprises apparatus for clamping an inserted speaker enclosure to the periphery of a ceiling panel into which the speaker enclosure has been inserted. The system may also include a dismounting device. The system also includes initially spring-biased interlockable ratchet teeth that are latched at installation.

An improved manually operated flip dog mountable ceiling speaker enclosure, for ceiling or other panel installation, has a biased sliding ratchet block that can be latched in place by an extension from a T-handle of an integral actuator rod. The ratchet block is controlled in its sliding motion by alignment rods extending from a vertical portion of a base and slidingly received in alignment bores of the ratchet block. A face of the ratchet block has downward pointing ratchet teeth that engage upward pointing ratchet teeth on a barrel of a flip dog to hold the flip dog in a clamped position. Over time, the biasing springs may lose their strength, but the latching of the ratchet block obviates this problem.

While the exemplary embodiment is illustrated for speaker enclosures, the scope of the present invention also includes enclosures for lighting fixtures, such as can lights, or any other device that needs to be supported in an enclosure in a ceiling or wall. The present invention has, among other advantages, the ability to work well with very thin or very thick ceiling tiles or panels.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The term "speaker" as defined and used herein refers to an audio loudspeaker. Directional modifiers such as "top", "bottom", and the like are oriented to the preferred ceiling installation of the flip dog mountable ceiling speaker enclosure 100 with the diaphragm 108 pointed down from the ceiling. Those of skill in the art, informed by the present disclosure, will appreciate that the flip dog mountable ceiling speaker enclosure 100 can also be mounted in walls, including slanted walls. "Dog" as defined and used herein refers to a securing element, such as a clamping element, as in the nautical "Dog down that hatch!"

Figure 1:
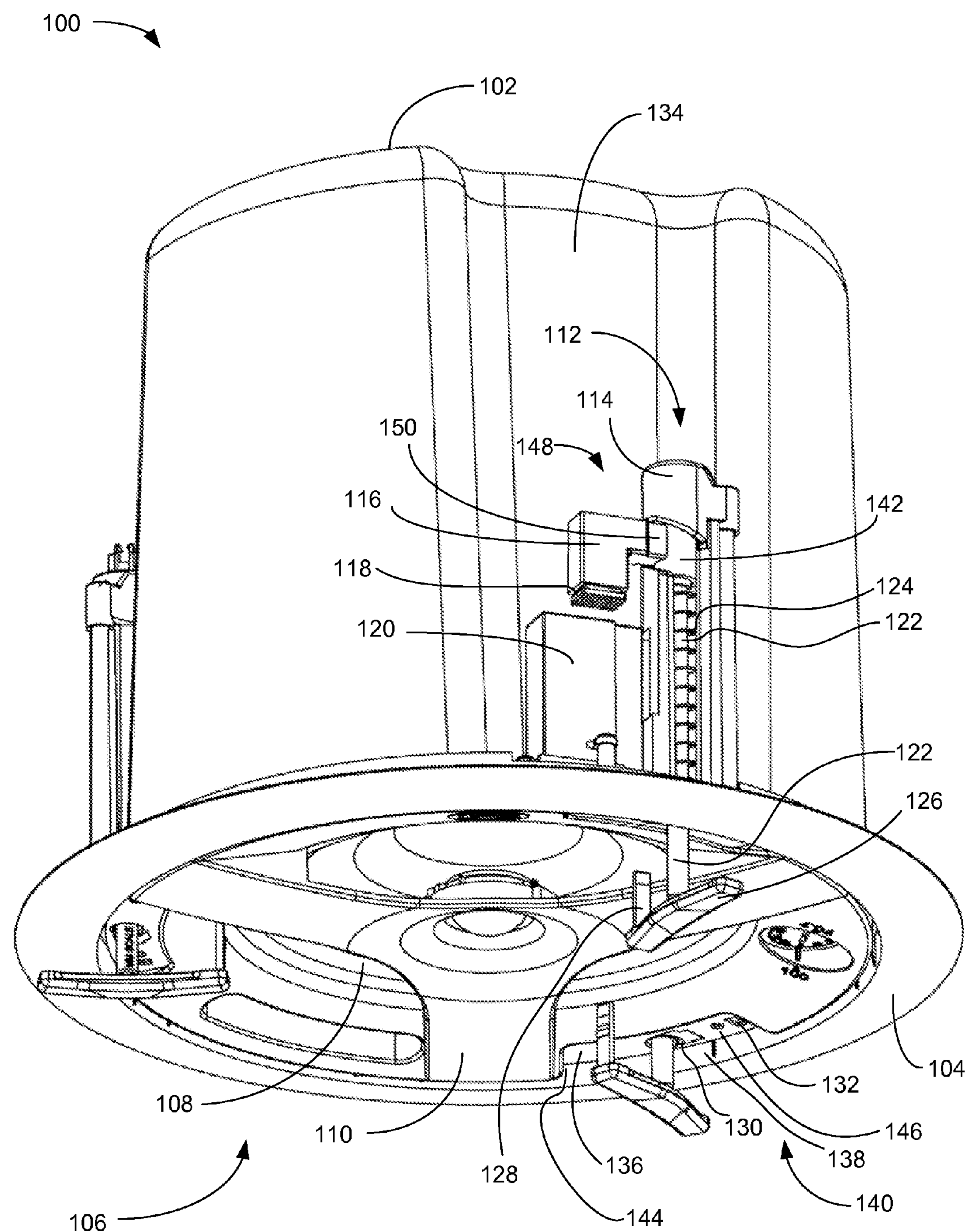
FIG. 1 is a bottom front perspective view illustrating an exemplary embodiment of an improved flip dog mountable ceiling speaker enclosure with a flip dog in a stowed position, according to a preferred embodiment of the present invention.

FIG. 1 is a bottom front perspective view illustrating an exemplary embodiment of an improved flip dog mountable ceiling speaker enclosure 100 with a flip dog foot 116 in a stowed position, according to a preferred embodiment of the present invention. Flip dog 148 includes flip dog barrel 142, flip dog neck 150, flip dog foot 116, and resilient portion 118. Exemplary speaker enclosure 100 includes a speaker can 102, a rim assembly 140, and three flip dog assemblies 112 (one of two visible is labeled). The speaker can 102 is generally cylindrical but has three indentations 134 accommodating, respectively, the three flip dog assemblies 112. In various other embodiments, more or less than three flip dog assemblies 112 and corresponding indentations 134 may be used. The speaker can 102 retains speaker 106 in downward pointing direction, as shown. Speaker 106 includes grill 110 and diaphragm 108, as well as the driver (not shown) for the diaphragm 108. The design of grill 110 is not limited to the design shown.

Rim assembly 140 includes rigid annular rim 104, cylindrical inner wall 138, and inner annular support panel 136. Preferably, annular rim 104, cylindrical inner wall 138, and inner annular support panel 136 are made of one piece to form rim assembly 140. In additional embodiments, the rim assembly 140 may be made of separate pieces affixed together. Inner annular support panel 136 supports all flip dog assemblies 112 and speaker can 102. Inner annular support panel 136 has three perforations corresponding to each flip dog assembly 112. The first perforation is a round hole 130 which accommodates actuator rod 122. The second perforation is a rectangular hole 132 into which latch 128 is inserted as a last step of deployment of the speaker enclosure 100. Inner annular support panel 136 forms a ceiling for a cavity 144 that is sized and shaped to receive T-handle 126. The third opening is disengagement aperture 146 for receiving a tool for disengaging the ratchets and releasing the flip dog foot 116 from the clamping position.

Actuator rod 122 is coupled to T-handle 126 and latch 128 extends from one end of T-handle 126. Actuator rod 122 extends through round hole 130 in inner annular support panel 136 and into a chamber, described in detail below, of the flip dog assembly 112. Compression coil spring 124 winds around actuator rod 122 and creates and upward force on a barrel 142 of flip dog foot 116. Flip dog foot 116 has a resilient bottom portion 118 to compensate for uncertainty derived from the discrete steps inherent in a ratchet mechanism. Actuator rod 122 has a top end (described in detail below) that couples to the inside of the barrel 142 for pulling the flip dog foot 116 downward or, alternatively, pushing upward, free of flip dog barrel 142 and protruding above headpiece 114. Ratchet spring assembly cover 120 covers the ratchet spring assembly 826 (see FIG. 8B), which will be described in more detail below. FIG. 1 is exemplary of the state of the speaker enclosure 100 when shipped.

Figure 2:
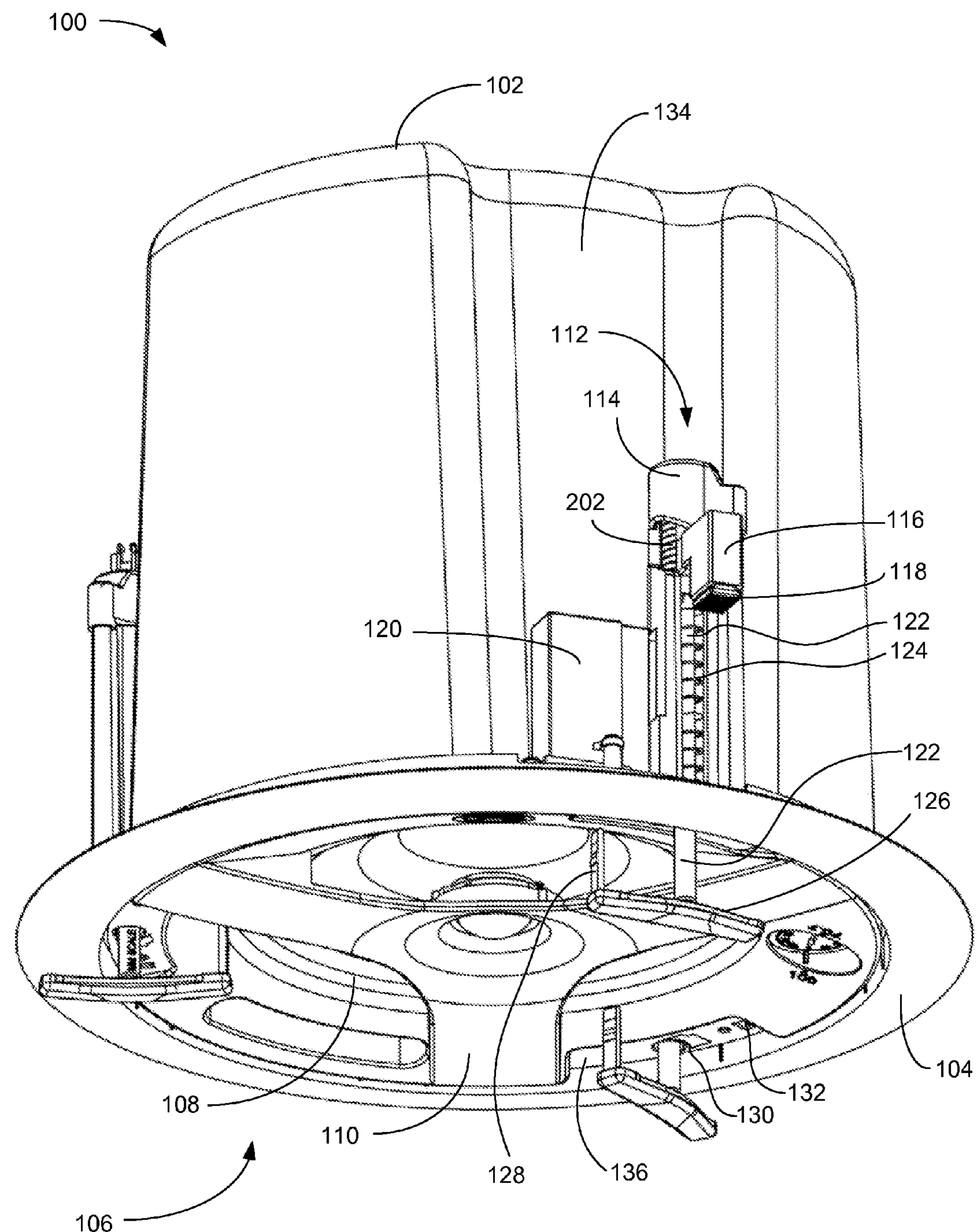
FIG. 2 is a bottom front perspective view illustrating an exemplary embodiment of an improved flip dog mountable ceiling speaker enclosure of FIG. 1 with a flip dog in a rotated position, according to a preferred embodiment of the present invention.

FIG. 2 is a bottom front perspective view illustrating an exemplary embodiment of an improved flip dog mountable ceiling speaker enclosure 100 of FIG. 1 with a flip dog foot 116 in a rotated position, according to a preferred embodiment of the present invention. When flip dog foot 116 is in the rotated position, as a result of manual turning of the T-handle 126, a side of barrel 142 that has upward pointing ratchet teeth 202 is moved to align above the ratchet spring assembly 826 (see FIG. 8B). Once in the rotated position, as shown, flip dog foot 116 may be manually pulled downward by exerting downward force on T-handle 126.

Figure 3:
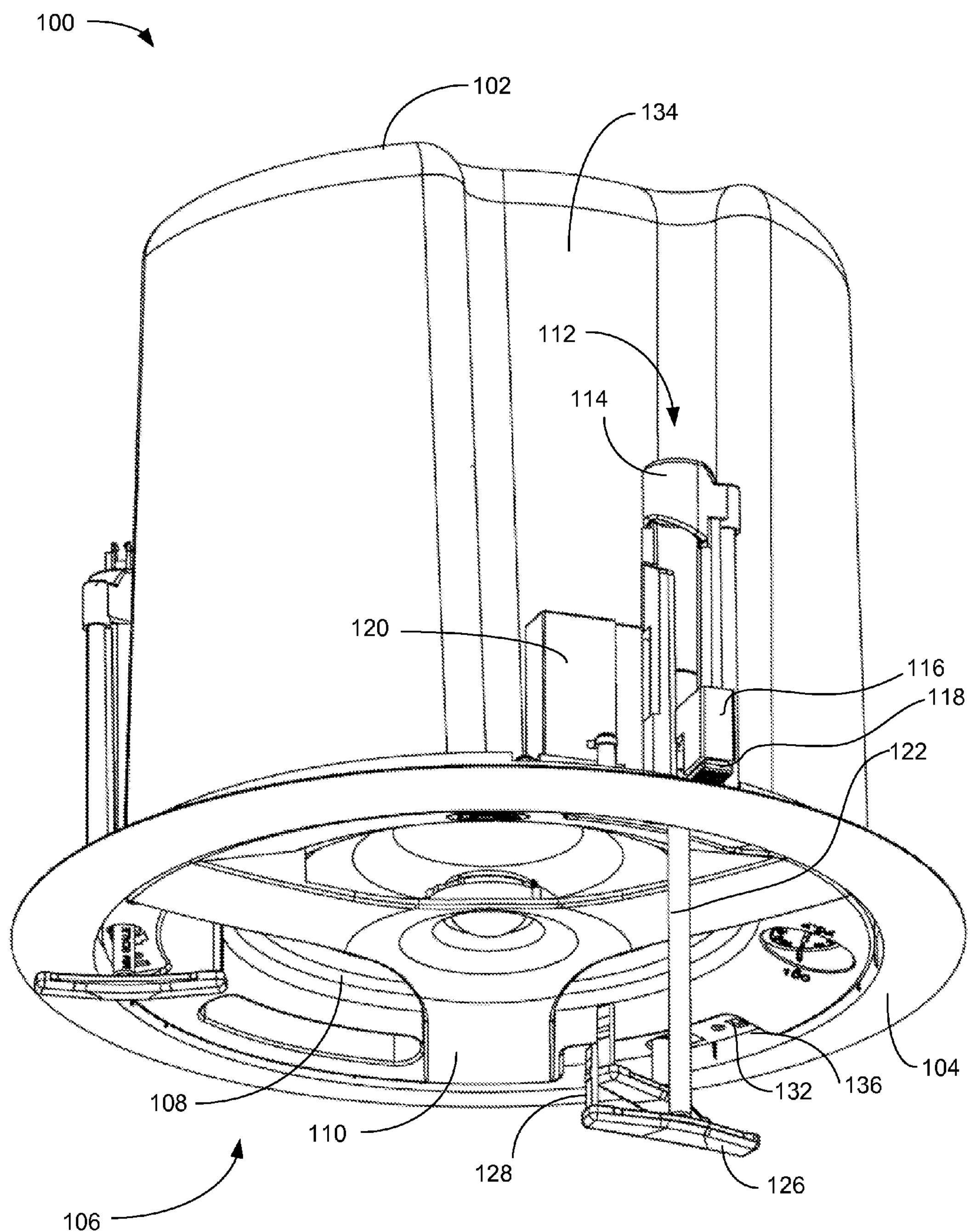
FIG. 3 is a bottom front perspective view illustrating an exemplary embodiment of an improved flip dog mountable ceiling speaker enclosure of FIG. 1 with a flip dog in a clamped position, according to a preferred embodiment of the present invention.

FIG. 3 is a bottom front perspective view illustrating an exemplary embodiment of an improved flip dog mountable ceiling speaker enclosure 100 of FIG. 1 with a flip dog foot 116 in a clamped position, according to a preferred embodiment of the present invention. As shown, T-handle 126 has been pulled down against the bias of coil spring 124 to lower flip dog foot 116 into the clamped position. In the clamped position, flip dog foot 116 clamps a ceiling tile or panel (not shown) between resilient portion 118 and rigid rim 104, thus securing the speaker enclosure 100 in the ceiling.

Figure 4:
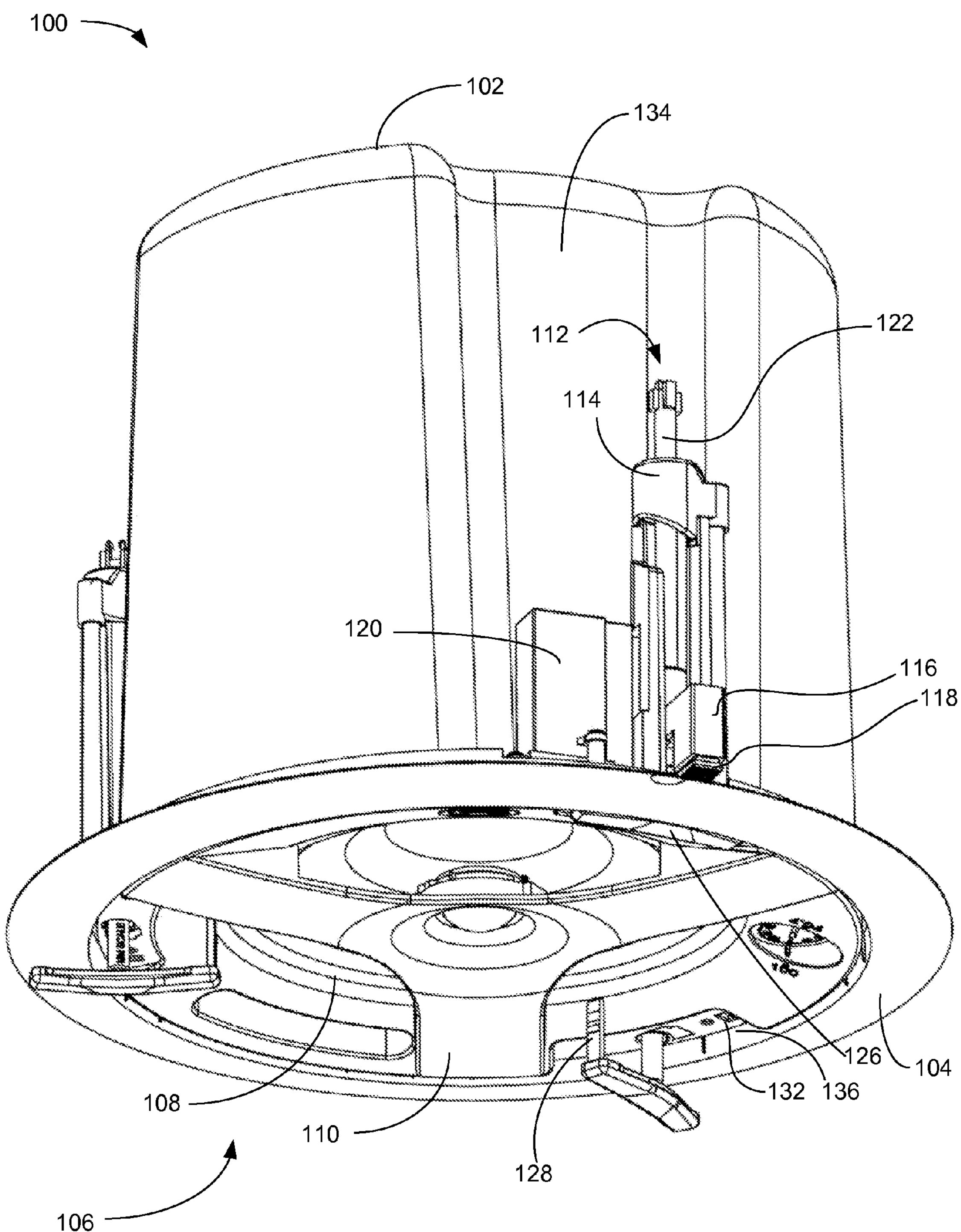
FIG. 4 is a bottom front perspective view illustrating an exemplary embodiment of an improved flip dog mountable ceiling speaker enclosure of FIG. 1 with a flip dog in a clamped position and a T-handle in a stowed position, according to a preferred embodiment of the present invention.

FIG. 4 is a bottom front perspective view illustrating an exemplary embodiment of an improved flip dog mountable ceiling speaker enclosure 100 of FIG. 1 with a flip dog foot 116 in a clamped position and a T-handle 126 in a stowed position, according to a preferred embodiment of the present invention. The illustrated configuration shows the completed installation for one of three flips dog assemblies 112 (one of three labeled). Each T-handle 126, in turn, is rotated to un-stow the flip dog foot 116, pulled down to clamp the flip dog foot 116, and then pushed up to stow the T-handle 126 and, as will be seen below, to secure the ratchet spring assembly 826 (see FIG. 8B) with latch 128.

Figure 5:
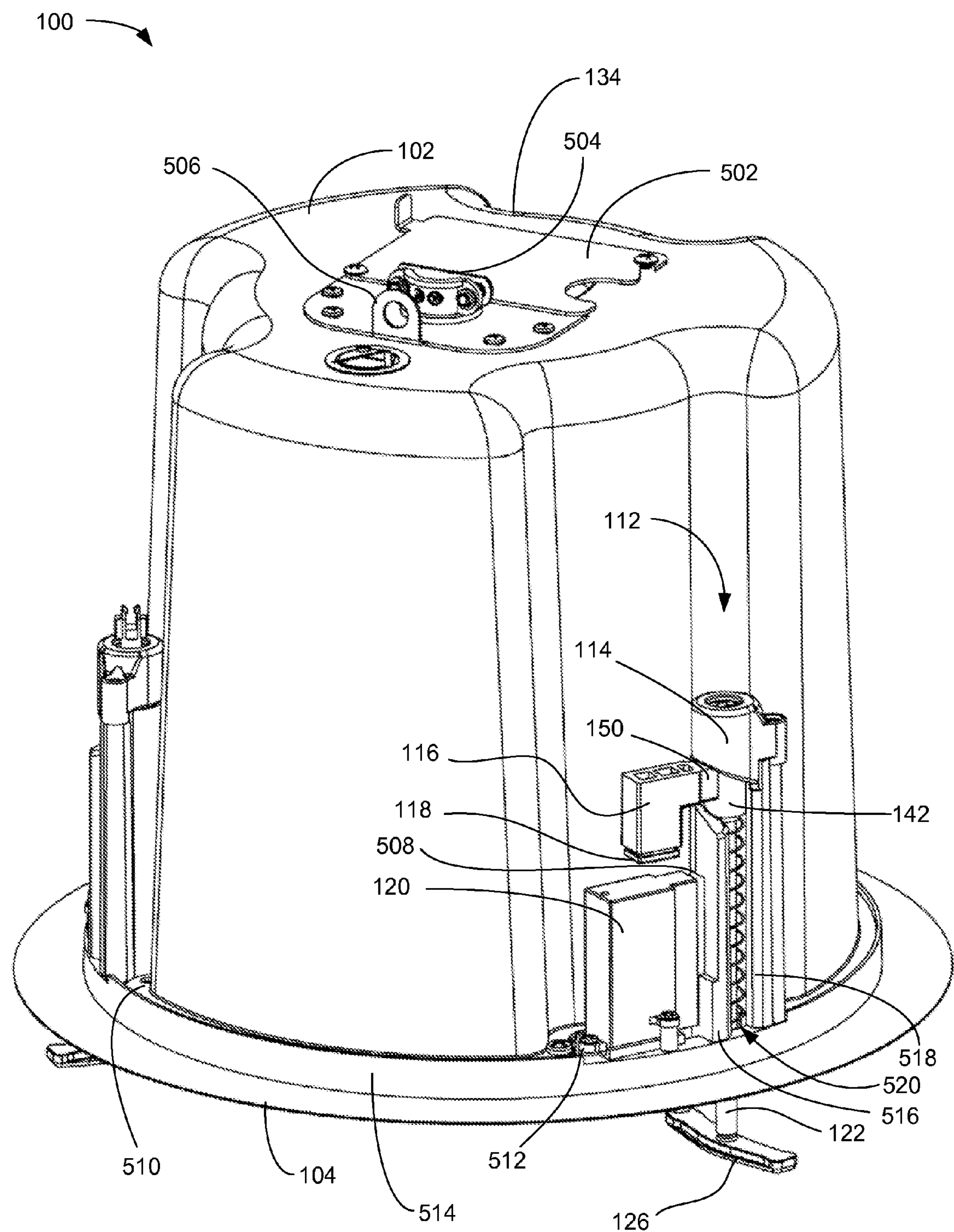
FIG. 5 is a top front perspective view illustrating an exemplary embodiment of an improved flip dog mountable ceiling speaker enclosure of FIG. 1 with a flip dog in a stowed position, according to a preferred embodiment of the present invention.

FIG. 5 is a top front perspective view illustrating an exemplary embodiment of an improved flip dog mountable ceiling speaker enclosure 100 of FIG. 1 with a flip dog foot 116 in a stowed position, according to a preferred embodiment of the present invention. Speaker wiring access plate 502 is closed with a screw but can be opened, usually prior to installation, for tap selection or similar tasks. Audio signal wire coupling 504 provides coupling for audio signal wires and electrical power, when needed. Cable guide 506 keeps wires in an orderly fashion. Chamber 520 is defined, in part, by arcuate walls 516 and 518. Chamber 520 receives the actuator rod 122 and the compression coil spring 124, as well as the flip dog barrel 142. Left arcuate wall has an opening 508 that receives an end of the ratchet spring assembly 826 (within cover 120) and presents spring-biased downwardly-pointed teeth inside chamber 520 for engaging upwardly pointed teeth 202 on the flip dog barrel 142. The flip dog assembly 112 includes a flip dog neck 150 between flip dog foot 116 and flip dog barrel 142.

Annular wall 514 defines the size of a hole in a ceiling tile or panel into which the speaker enclosure 100 will fit. The annular wall 514 has a lower-height portion 512 proximate each flip dog assembly 112. Annular wall 514 may be of one piece with the rim assembly 140 and, in some embodiments, may be an extension of cylindrical inner wall 138. Flange 510 is of one piece with speaker can 102 and is used to fasten speaker can 102 to annular support panel 136.

Figure 6:
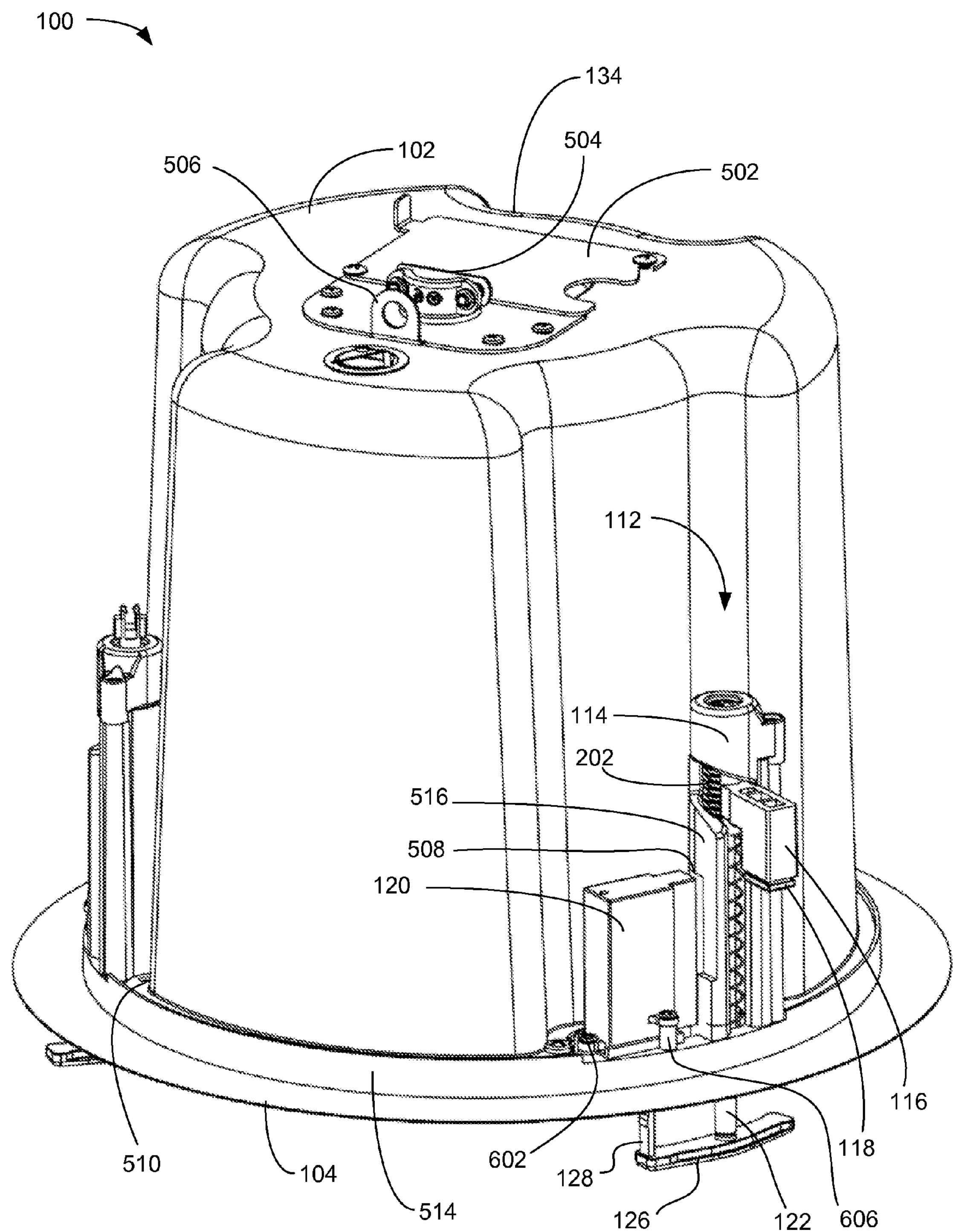
FIG. 6 is a top front perspective view illustrating an exemplary embodiment of an improved flip dog mountable ceiling speaker enclosure of FIG. 1 with a flip dog in a rotated position, according to a preferred embodiment of the present invention.

FIG. 6 is a top front perspective view illustrating an exemplary embodiment of an improved flip dog mountable ceiling speaker enclosure 100 of FIG. 1 with a flip dog foot 116 in a rotated position, according to a preferred embodiment of the present invention. Fastener receivers 602 and 606 are used to fasten the spring assembly cover 120 to the flip dog assembly 112.

Figure 7:
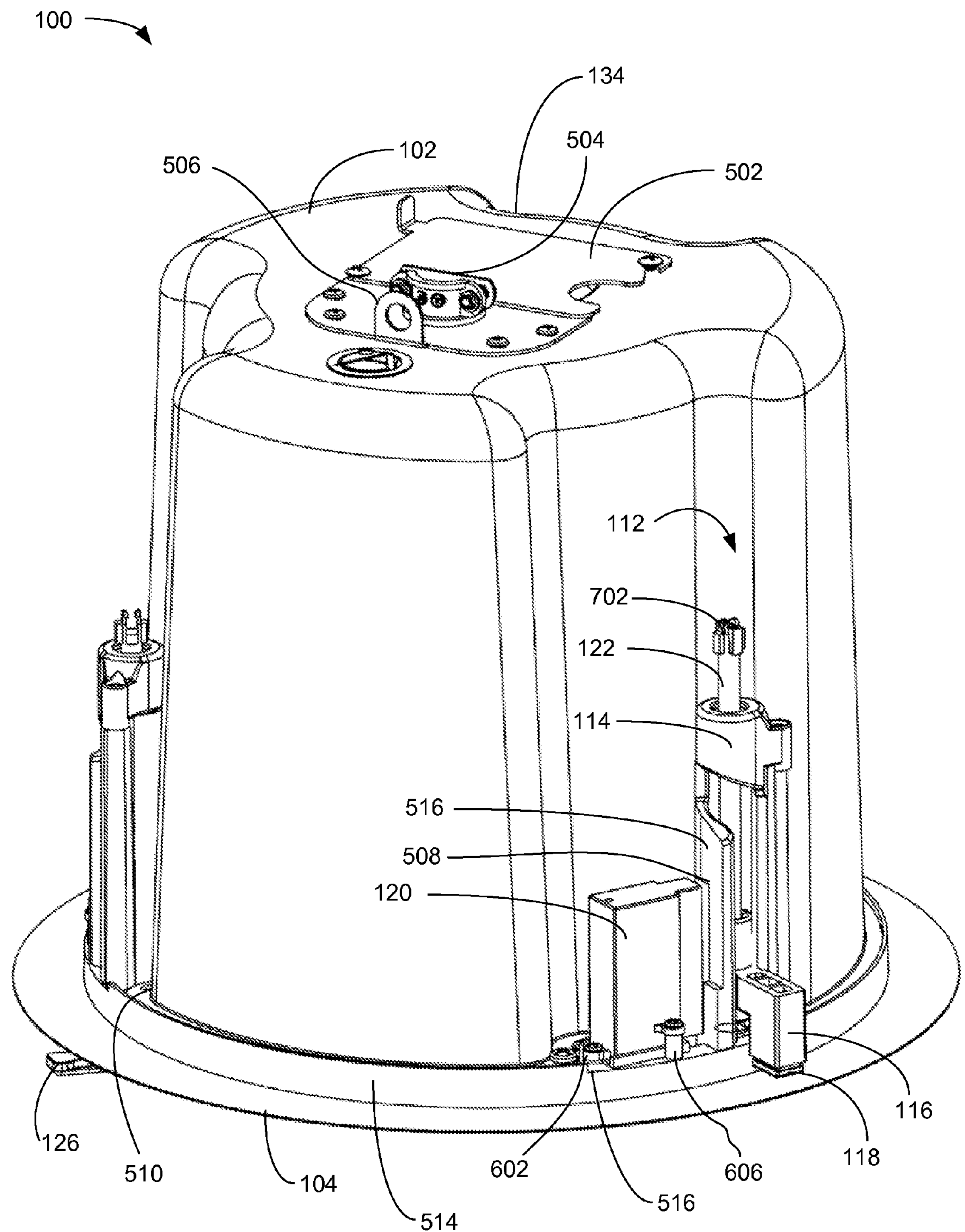
FIG. 7 is a top front perspective view illustrating an exemplary embodiment of an improved flip dog mountable ceiling speaker enclosure of FIG. 1 with a flip dog in a clamped position, according to a preferred embodiment of the present invention.

FIG. 7 is a top front perspective view illustrating an exemplary embodiment of an improved flip dog mountable ceiling speaker enclosure 100 of FIG. 1 with a flip dog foot 116 in a clamped position, according to a preferred embodiment of the present invention. T-handle 126 has been stowed, as evidenced by the protrusion of actuator rod 120 from headpiece 114. End piece 702 interacts with flip dog barrel 142 so as to be able to exert a downward force, but not an upward force on the flip dog barrel 142. End piece 702 can move through a bore in head piece 114 in either direction.

Figure 8A:
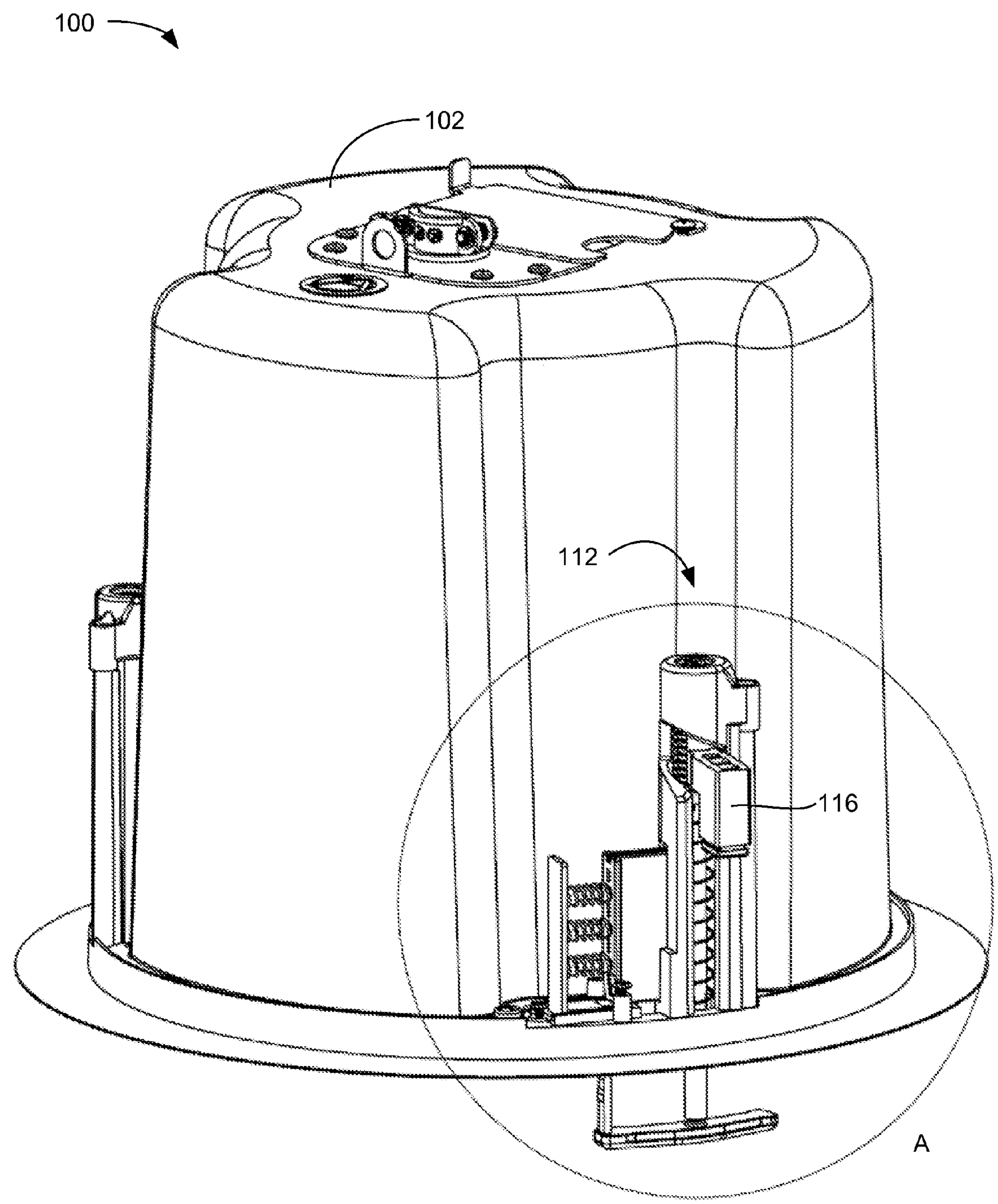
FIG. 8A is a top front perspective view illustrating an exemplary embodiment of an improved flip dog mountable ceiling speaker enclosure of FIG. 1 with a flip dog in a rotated position and the spring assembly cover removed and defining a detail "A", according to a preferred embodiment of the present invention.

FIG. 8A is a top front perspective view illustrating an exemplary embodiment of an improved flip dog mountable ceiling speaker enclosure 100 of FIG. 1 with a flip dog foot 116 in a rotated position and the spring assembly cover 120 removed and defining a detail "A", according to a preferred embodiment of the present invention.

Figure 8B:
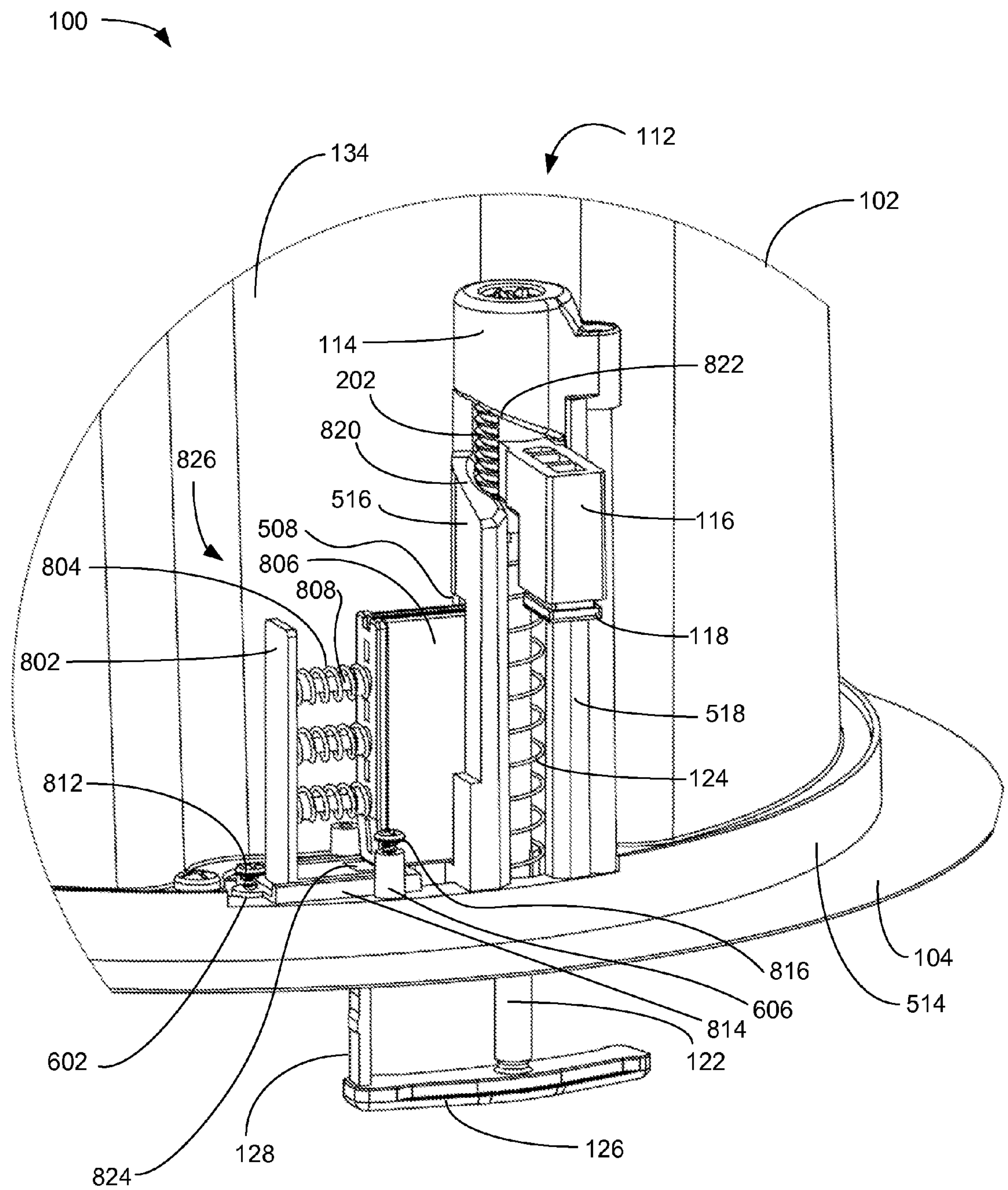
FIG. 8B is a top front perspective view illustrating detail "A" of an exemplary embodiment of an improved flip dog mountable ceiling speaker enclosure of FIG. 1 with a flip dog in a rotated position and the spring assembly cover removed, according to a preferred embodiment of the present invention.

FIG. 8B is a top front perspective view illustrating detail "A" of an exemplary embodiment of an improved flip dog mountable ceiling speaker enclosure 100 of FIG. 1 with a flip dog foot 116 in a rotated position and the spring assembly cover 120 removed, according to a preferred embodiment of the present invention. Ratchet spring assembly 826 includes L-shaped base 802 fixed at a distal end of channel 814, which is fastened to inner annular support panel 136 through fastener receivers 602 and 606 using fasteners 812 and 816, illustrated as screws. Three alignment rods 808 (one of three labeled) extend from a vertical face of L-shaped base and are slidingly received in bores in ratchet block 806. Alignment rods 808 align ratchet springs 804 to engage ratchet block 806 and bias ratchet block 806 into opening 508 in arcuate wall 516. At least a portion of the face of ratchet block 806 has downward pointing teeth for engaging upward pointing teeth 202 on the flip dog barrel 142. Alignment rods 808 also align ratchet block 806 by remaining rigid and sliding in bores 1402 (see FIG. 14) within ratchet block 806. The horizontal portion of the L-shaped base 802 has an opening 824 which aligns with opening 132 in the inner annular support panel 136 to receive latch 128, when T-handle 126 is in the stowed position.

Sloped surface 820 on top of arcuate wall 516 and sloped surface 822 on the bottom of headpiece 114 act together to form a segment of a helical channel that engages the flip dog neck 150 between flip dog foot 116 and flip dog barrel 142 during rotation of the flip dog foot 116 from the stowed position to the rotated position.

Figure 9A:
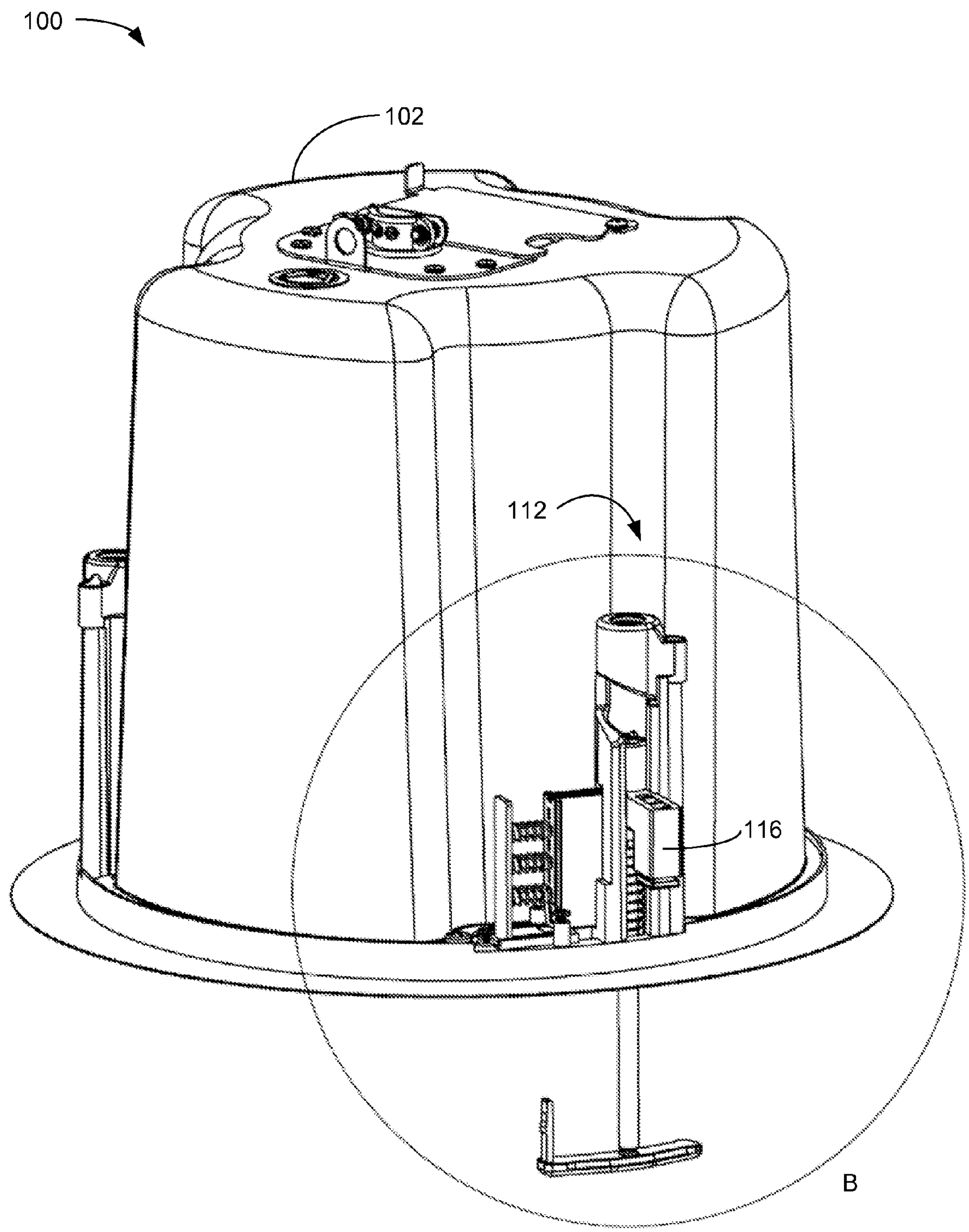
FIG. 9A is a top front perspective view illustrating an exemplary embodiment of an improved flip dog mountable ceiling speaker enclosure of FIG. 1 with a flip dog in a clamped position and the spring assembly cover removed and defining a detail "B", according to a preferred embodiment of the present invention.

FIG. 9A is a top front perspective view illustrating an exemplary embodiment of an improved flip dog mountable ceiling speaker enclosure 100 of FIG. 1 with a flip dog foot 116 in a clamped position and the spring assembly cover 120 removed and defining a detail "B", according to a preferred embodiment of the present invention.

Figure 9B:
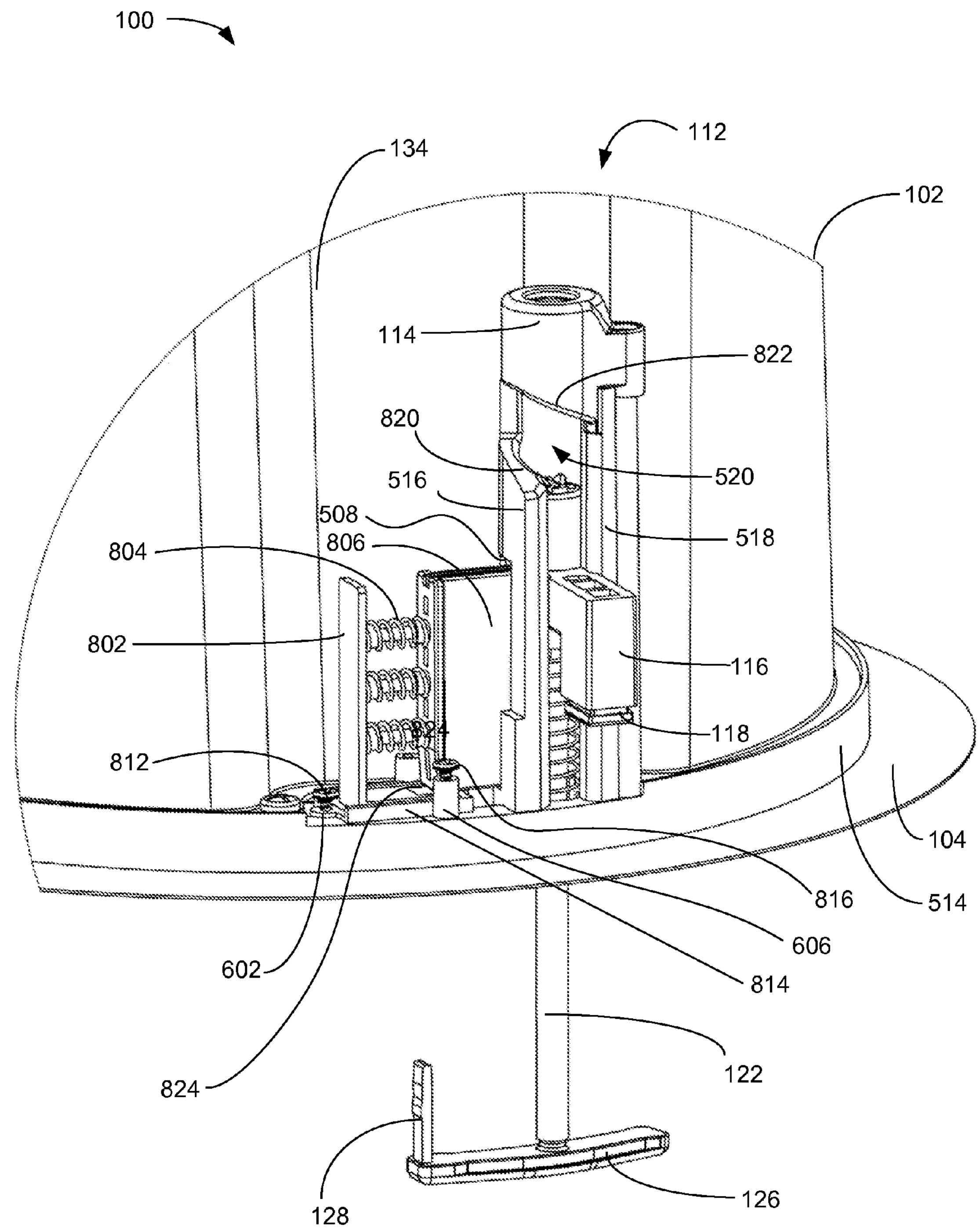
FIG. 9B is a top front perspective view illustrating detail "B" of an exemplary embodiment of an improved flip dog mountable ceiling speaker enclosure of FIG. 1 with a flip dog in a clamped position and the spring assembly cover removed, according to a preferred embodiment of the present invention.

FIG. 9B is a top front perspective view illustrating detail "B" of an exemplary embodiment of an improved flip dog mountable ceiling speaker enclosure 100 of FIG. 1 with a flip dog foot 116 in a clamped position and the spring assembly cover 120 removed, according to a preferred embodiment of the present invention.

Figure 10A:
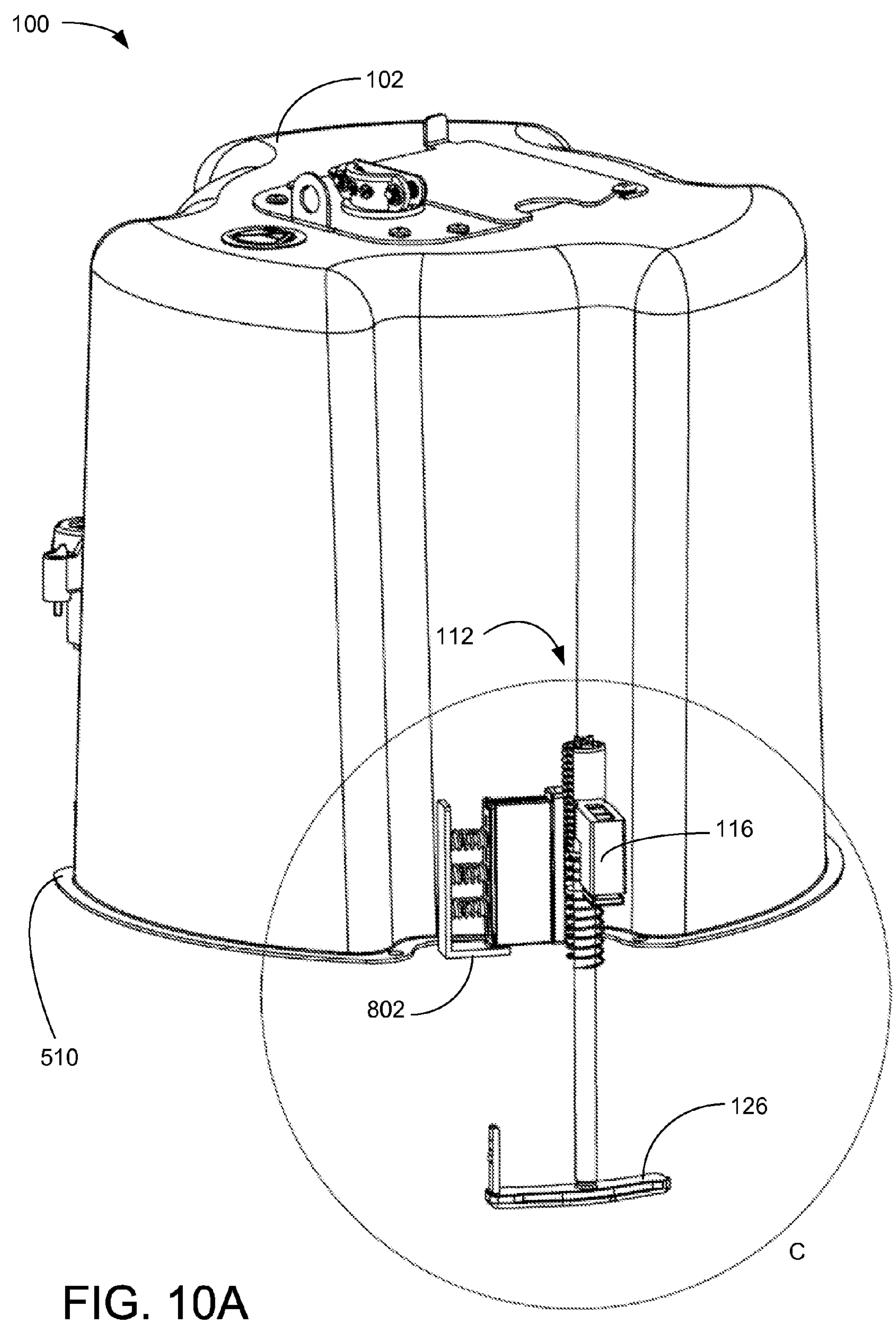
FIG. 10A is a top front perspective view illustrating an exemplary embodiment of an improved flip dog mountable ceiling speaker enclosure of FIG. 1 with a flip dog in a clamped position and the spring assembly cover removed; rim and support assemblies removed; and defining a detail "C", according to a preferred embodiment of the present invention.

FIG. 10A is a top front perspective view illustrating an exemplary embodiment of an improved flip dog mountable ceiling speaker enclosure 100 of FIG. 1 with a flip dog foot 116 in a clamped position and the spring assembly cover 129 removed; rim assembly 140 removed; and defining a detail "C", according to a preferred embodiment of the present invention.

Figure 10B:
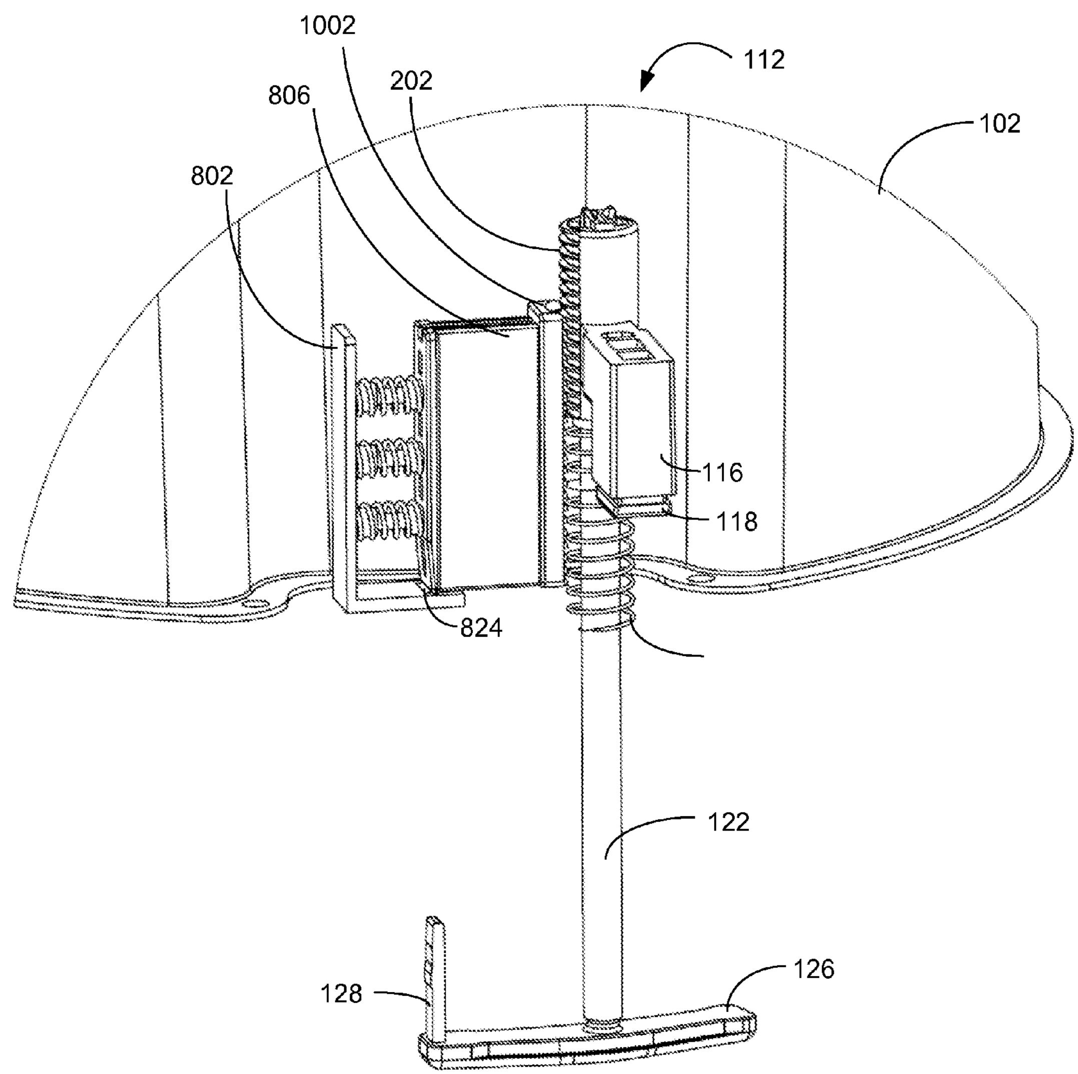
FIG. 10B is a top front perspective view illustrating detail "B" of an exemplary embodiment of an improved flip dog mountable ceiling speaker enclosure of FIG. 1 with a flip dog in a clamped position and the spring assembly cover removed; rim and support assemblies removed; and defining a detail "C", according to a preferred embodiment of the present invention.

FIG. 10B is a top front perspective view illustrating detail "B" of an exemplary embodiment of an improved flip dog mountable ceiling speaker enclosure of FIG. 1 with a flip dog in a clamped position and the spring assembly cover removed; rim and support assemblies removed; and defining a detail "C", according to a preferred embodiment of the present invention. Ratchet rack 1002 is part of ratchet block 806 and includes the ratchet teeth that engage ratchet teeth 202 on flip dog barrel 142.

Figure 11:
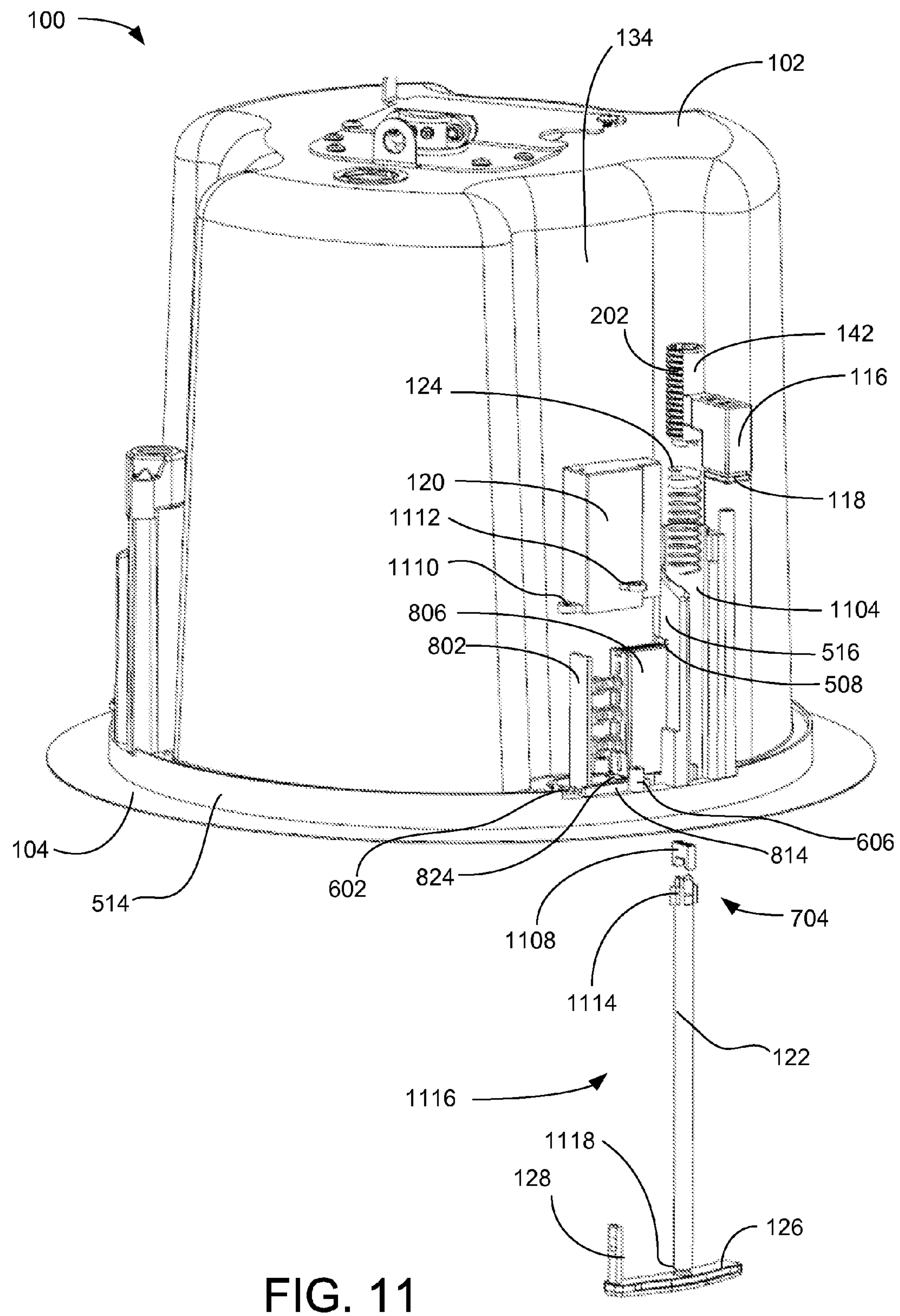
FIG. 11 is a top front first perspective partially exploded view illustrating an exemplary embodiment of an improved flip dog mountable ceiling speaker enclosure of FIG. 1, according to a preferred embodiment of the present invention.

FIG. 11 is a top front first perspective partially exploded view illustrating an exemplary embodiment of an improved flip dog mountable ceiling speaker enclosure 100 of FIG. 1, according to a preferred embodiment of the present invention. Actuator 1116 includes T-handle 126 and latch 128 extending from an end of T-handle 126, as shown. Actuator rod 122 extends from T-handle 126 via a small portion 1118 of diminished diameter. Actuator rod 122 has an end piece 702 comprised of clip receiver 1114 and clip 1108. During manufacture, actuator rod 122 with clip receiver 1114 is threaded through hole 130 into chamber 520, though flip dg barrel 142. Clip 1108 is then snap-fitted into clip receiver 1114 so that actuator rod 122 cannot be pulled out of flip dog barrel 142. Ratchet spring assembly cover 120 has fastener receivers 1110 and 1112 that align with fastener receivers 602 and 606, respectively for fastening the cover 120 over the ratchet spring assembly 826. Rear arcuate wall 1104 completes chamber 520, extending between arcuate walls 516 and 518.

Figure 12:
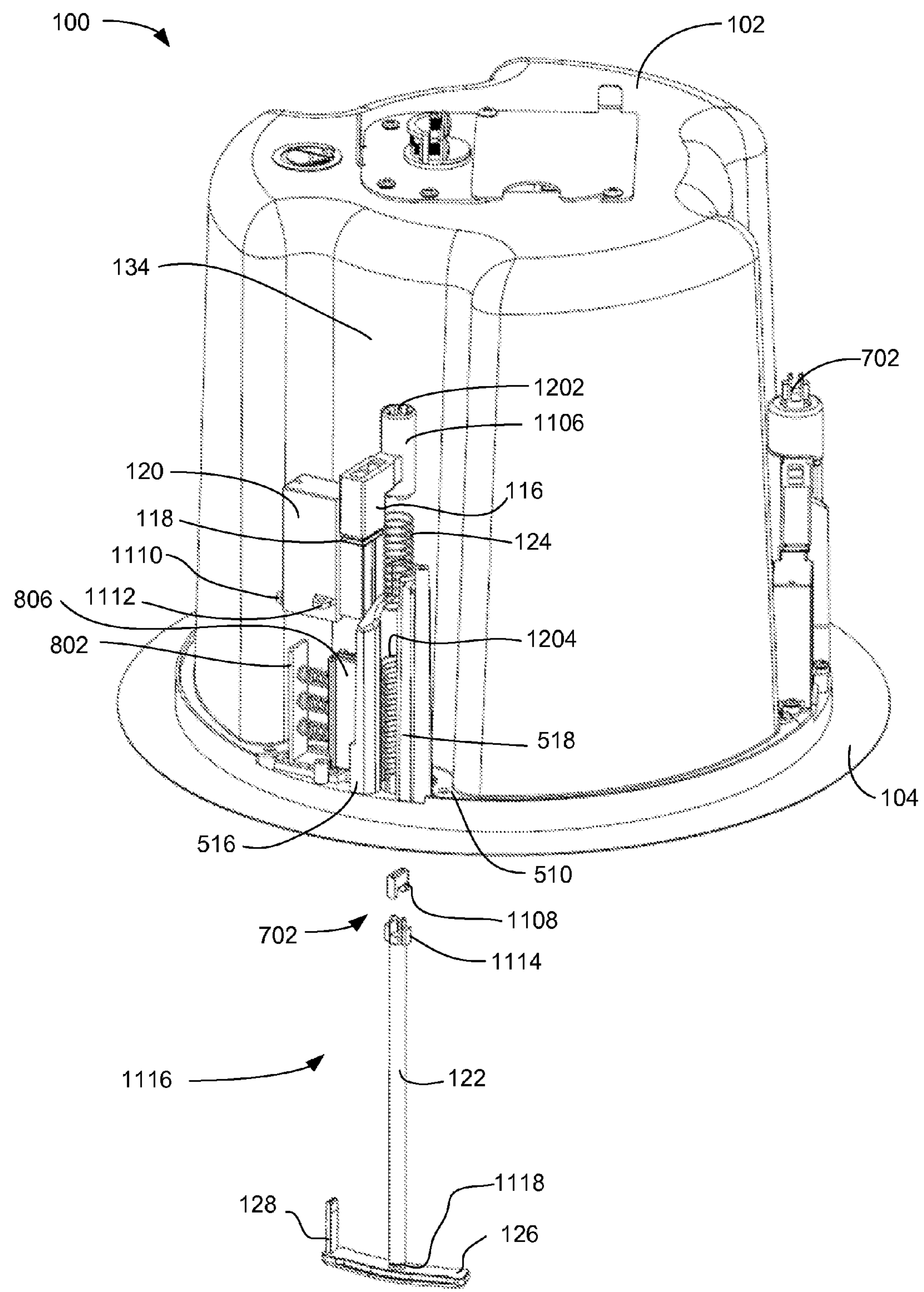
FIG. 12 is a top front second perspective partially exploded view illustrating an exemplary embodiment of an improved flip dog mountable ceiling speaker enclosure of FIG. 1, according to a preferred embodiment of the present invention.

FIG. 12 is a top front second perspective partially exploded view illustrating an exemplary embodiment of an improved flip dog mountable ceiling speaker enclosure 100 of FIG. 1, according to a preferred embodiment of the present invention. A cavity 1202 at the top of flip dog barrel 142 is configured to allow clip receiver 1114 on rod 122 to pass through flip dog barrel 142, but once clip 1112 is attached to clip receiver 1114 to form end piece 702, end piece 702 cannot be pulled through flip dog barrel 142. Downward pointing arcuate ratchet teeth 1204 extend from biased sliding ratchet block 806 through an opening 508 in wall 516 to engage upward pointing arcuate ratchet teeth 202 on the flip dog barrel 142.

Figure 13A:
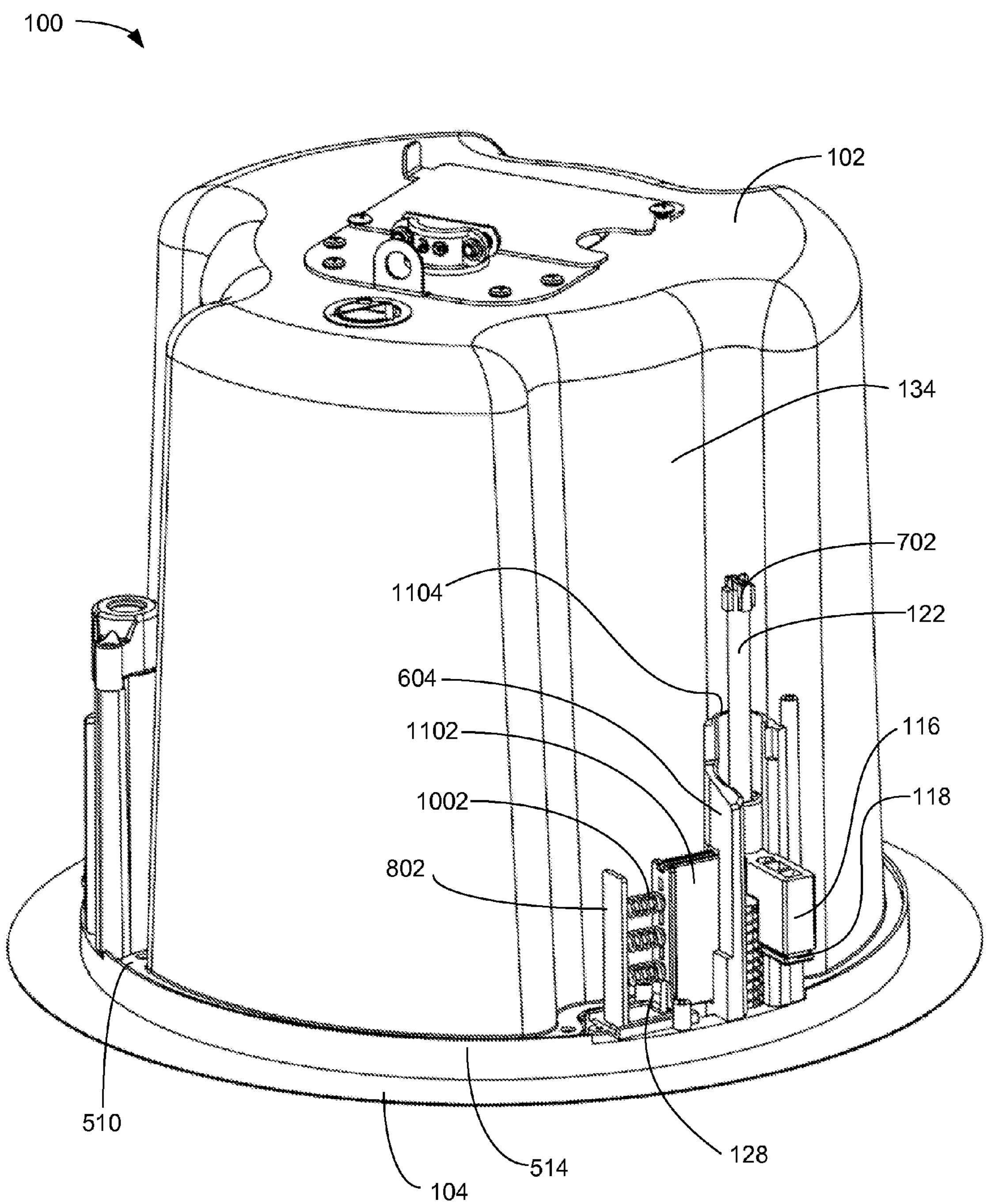
FIG. 13A is a top front perspective view illustrating an exemplary embodiment of an improved flip dog mountable ceiling speaker enclosure of FIG. 1 with a flip dog in a clamped position and the spring assembly cover removed, according to a preferred embodiment of the present invention.

FIG. 13A is a top front perspective view illustrating an exemplary embodiment of an improved flip dog mountable ceiling speaker enclosure 100 of FIG. 1 with a flip dog foot 116 in a rotated position and the spring assembly cover 129 removed, according to a preferred embodiment of the present invention. T-handle 126 is stowed, as evidenced by the protrusion of the actuator rod 122.

Figure 13B:
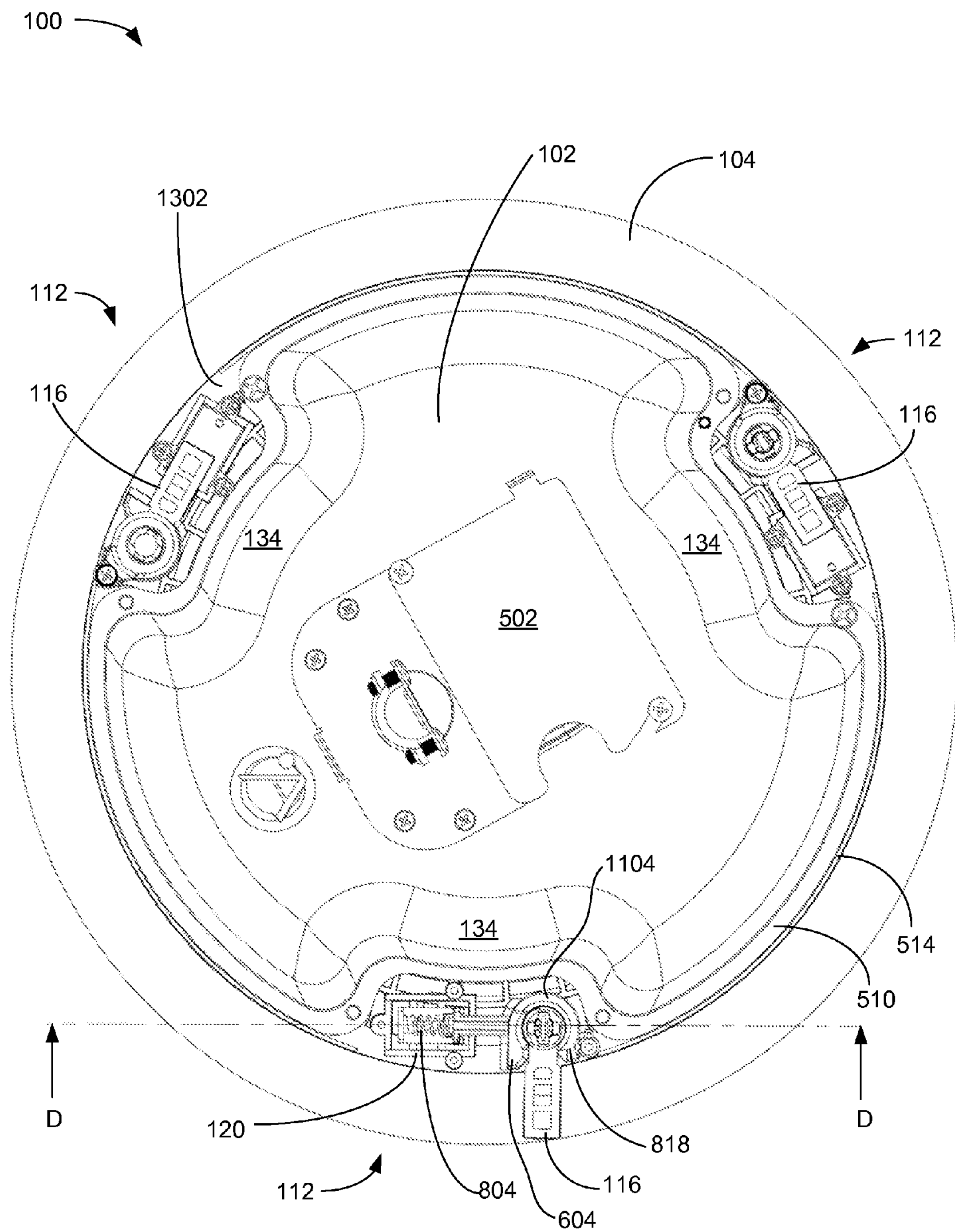
FIG. 13B is a top plan view illustrating an exemplary embodiment of an improved flip dog mountable ceiling speaker enclosure of FIG. 1 with a flip dog in a clamped position; the spring assembly cover removed; and defining cross section DD, according to a preferred embodiment of the present invention.

FIG. 13B is a top plan view illustrating an exemplary embodiment of an improved flip dog mountable ceiling speaker enclosure 100 of FIG. 1 with a flip dog foot 116 in a rotated position; the spring assembly cover 120 removed; and defining cross section DD, according to a preferred embodiment of the present invention.

Figure 13C:
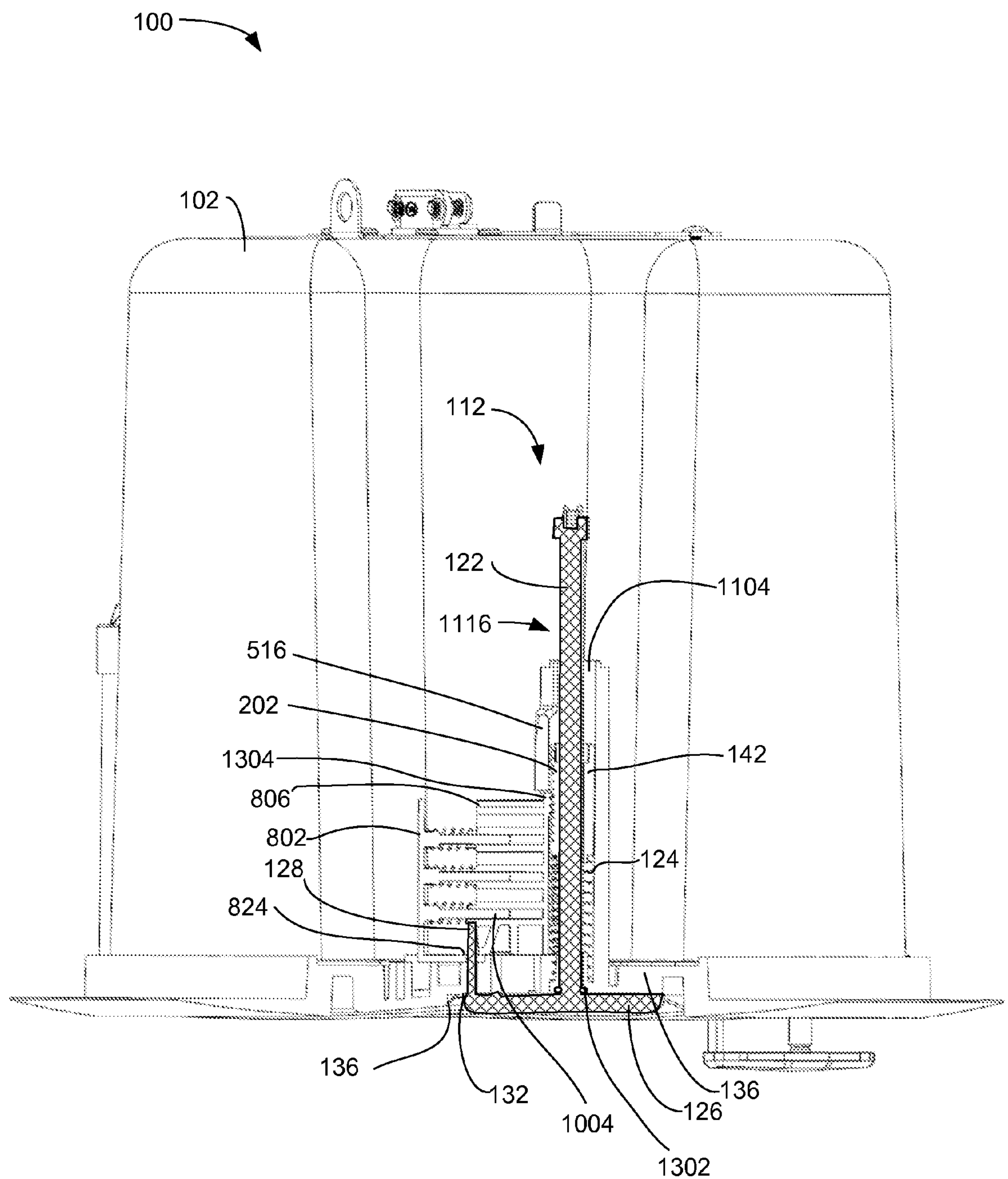
FIG. 13C is a front elevation view illustrating an exemplary embodiment of an improved flip dog mountable ceiling speaker enclosure of FIG. 1 through cross section DD with a flip dog in a clamped position and the spring assembly cover removed, according to a preferred embodiment of the present invention.

FIG. 13C is a front elevation view illustrating an exemplary embodiment of an improved flip dog mountable ceiling speaker enclosure 100 of FIG. 1 through cross section DD with a flip dog foot 116 in a rotated position and the spring assembly cover 120 removed, according to a preferred embodiment of the present invention. The actuator 1116 is shown in the stowed position. Ratchet teeth 1304 of ratchet block 806 are engaged with ratchet teeth 202 of the flip dog barrel 142, preventing upward movement of the flip dog foot 116 from the clamped position. Latch 128 is inserted through opening 824 and now prevents disengaging motion of the ratchet block 806. The portion 1118 of diminished diameter on actuator rod 122 is engaged by O-ring seal 1302 to keep T-handle 126 stowed. FIG. 13C illustrates the operational configuration of flip dog assembly 112.

Figure 14:
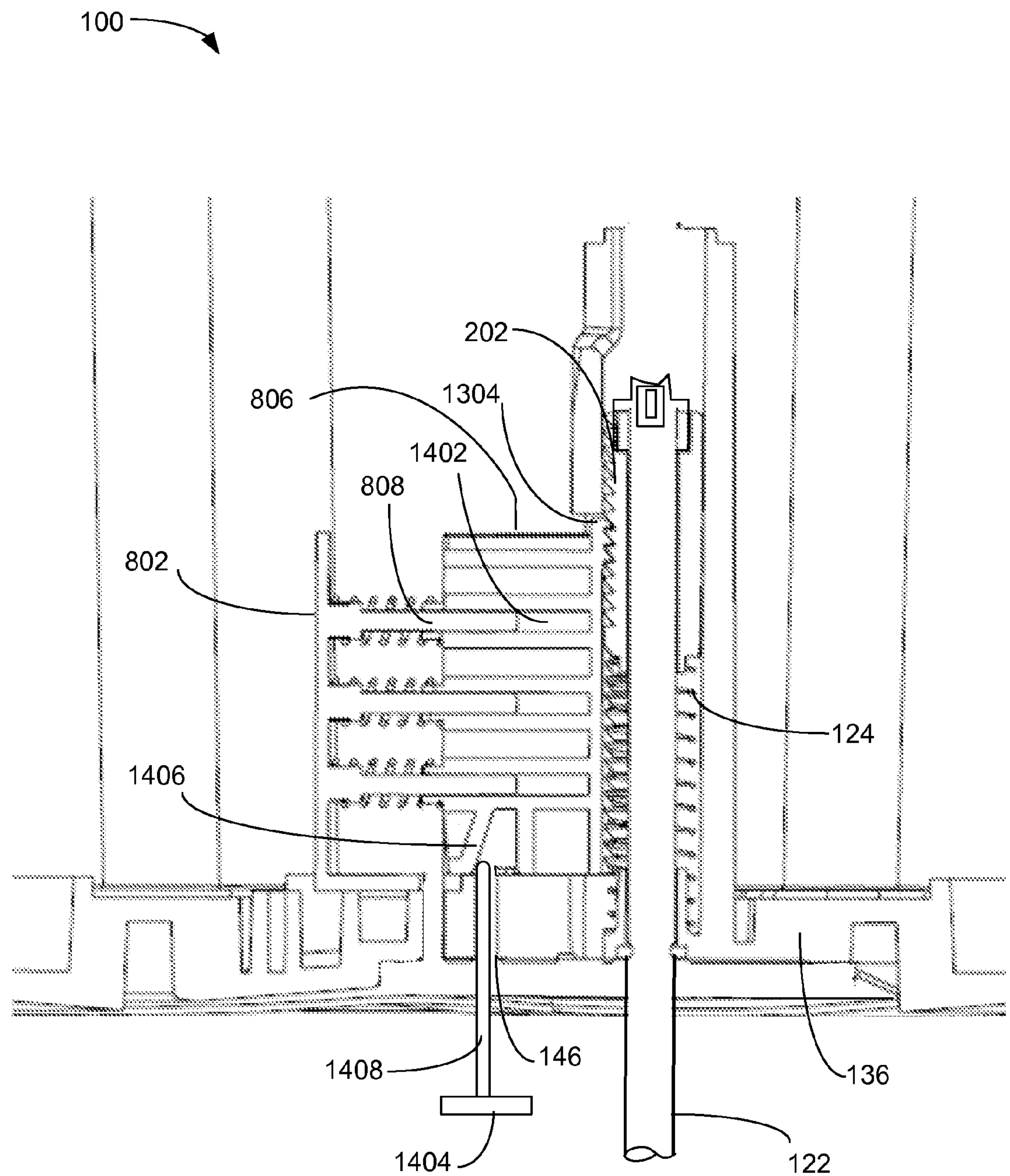
FIG. 14 is a detail of a front elevation view illustrating an exemplary embodiment of an improved flip dog mountable ceiling speaker enclosure of FIG. 1 through cross section DD, according to a preferred embodiment of the present invention.

FIG. 14 is a detail of a front elevation view illustrating an exemplary embodiment of an improved flip dog mountable ceiling speaker enclosure 100 of FIG. 1 through cross section DD, according to a preferred embodiment of the present invention. An apparatus 1404 and method for removing an installed speaker enclosure 100 is illustrated. Actuator rod 122 has been pulled down by T-handle 126, exposing aperture 146. A stiff rod 1408, preferably with a comfortable handle 1404, is inserted in aperture 146 and advanced to engagement with sloped wall 1406, which is an integral part of ratchet block 806. Advancing the rod 1408 further forces sloped wall 1406, and ratchet block 806 with it, away from the engaged position. When ratchet block teeth 1304 disengage from ratchet teeth 202 on the flip dog barrel 142, spring 124 will propel the flip dog barrel 142 upward, thereby unclamping the flip dog foot 116. The helical segment channel formed by surfaces 820 and 822 will tend to rotate the flip dog 116 towards the stowed position. If the rotation is not complete, it may be completed manually with the T-handle 126. Alignment rods 808 (one of three labeled) slide in bores 1402 (one of three labeled) to maintain alignment of the ratchet block 806 as it moves.

Although applicant has described applicant's preferred embodiment of this invention, it will be understood that the broadest scope of this invention includes such modifications as diverse shapes and sizes and materials. Such scope is limited only by the above specification and the claims below.

Further, many other advantages of applicant's invention will be apparent to those skilled in the art from the above descriptions.

We claim:

1. An improved manually mountable ceiling speaker enclosure, the improvement comprising a plurality of flip dog assemblies, each comprising a. a first set of three openings aligned alignable to a second set of three openings in an inner annular support panel of a rim assembly of said enclosure:

b. a flip dog having a plurality of arcuate upward pointing teeth extending from a barrel of said flip dog;

c. an arcuate chamber operable to slidingly receive said barrel and having an opening for receiving an end of a biased slidable ratchet block;

and wherein each said flip dog of each said flip dog assembly of said plurality of flip dog assemblies comprises a neck connecting said barrel to a flip dog foot.

2. The improvement of claim 1, wherein said arcuate chamber of each said flip dog assembly of said plurality of flip dog assemblies comprises at least one arcuate wall that extends from said inner annular support panel.

3. The improvement of claim 1, wherein each said flip dog of each said flip dog assembly of said plurality of flip dog assemblies comprises a resilient portion attached to said flip dog foot.

4. The improvement of claim 1, each said flip dog assembly of said plurality of flip dog assemblies comprising an integral actuator further comprising:

a. a rod extending slidably through a first opening of said second set of three openings in said inner annular support panel of said rim assembly of said enclosure and further extending slidably through said barrel and configured to both pull said flip dog downward in said arcuate chamber and to travel upward without restriction from said barrel;

b. a T-handle extending across a bottom end of said rod; and c. a latch extending upward from said T-handle and configured to fit slidingly into a second opening of said second set of three openings in said inner annular support panel of said rim assembly of said enclosure;

d. wherein said barrel comprises a first opening of said first set of three openings.

5. The improvement of claim 4, each said flip dog assembly of said plurality of flip dog assemblies comprising an end piece of said rod distal said T-handle, comprising a clip receiver and a clip, wherein said clip is configured to prevent said rod from being withdrawn through said barrel of said flip dog of a flip dog assembly of said plurality of said flip dog assemblies.

6. The improvement of claim 4, each said flip dog assembly of said plurality of flip dog assemblies comprising a ratchet spring assembly further comprising:

a. said slidable ratchet block having a plurality of alignment bores in a proximal side;

b. an L-shaped base comprising vertical and horizontal portions;

c. a plurality of alignment rods, each extending horizontally from said vertical portion and each slidingly received in an alignment bore of said plurality of alignment bores;

d. a plurality of coil springs, each surrounding one alignment rod of said plurality of alignment rods and configured to bias said ratchet block towards said chamber;

e. a second opening of said first set of three openings comprising a hole in said horizontal portion alignable with said second opening of said second set of three openings in an inner annular support panel of a rim assembly of said enclosure and configured to admit the passage of said latch when said slidable ratchet block is engaged and said T-handle is stowed; and f. a plurality of arcuate downwardly pointing teeth on a distal side of said slidable ratchet block, wherein said downwardly pointed teeth are configured to ratchet with said upwardly pointed teeth.

7. The improvement of claim 6, each said flip dog assembly of said plurality of flip dog assemblies comprising a rigid cover for said ratchet spring assembly.

8. The improvement of claim 6, each said flip dog assembly of said plurality of flip dog assemblies comprising a third opening of said first set of openings further comprising a disengagement opening in a bottom surface of said slidable ratchet block aligned to said third opening of said second set of three openings in an inner annular support panel of a rim assembly of said enclosure when said slidable ratchet block is ratchetly engaged, and is further aligned to a sloped wall inside said slidable ratchet block.

9. The improvement of claim 1, comprising a rim assembly comprising:

a. an annular rim operable as a jaw of a clamp;

b. an annular wall extending inside said annular rim;

c. said inner annular support panel extending inside said annular wall; and d. a plurality of first sets of three openings in an inner annular support panel of said rim assembly of said enclosure, said plurality of first sets of three openings equal in number to at least the number of said plurality of flip dogs.

10. The improvement of claim 1, comprising a speaker can:

a. coupled to said inner annular support panel;

b. operable to retain a speaker; and c. having a plurality of indentations, each configured to accommodate one flip dog assembly of said plurality of flip dog assemblies.

11. An improved manually mountable ceiling speaker enclosure, the improvement comprising:

a. a rim assembly comprising:

i. an annular rim operable as a jaw of a clamp;

ii. an annular wall extending inside said annular rim; and iii. an inner annular support panel extending inside said annular wall; and b. a plurality of flip dog assemblies, each comprising i. a first set of three openings alignable to a second set of three openings in said inner annular support panel of a rim assembly of said enclosure;

ii. a flip dog having a plurality of arcuate upward pointing teeth extending from a barrel of said flip dog;

iii. an arcuate chamber operable to slidingly receive said barrel and having an opening for receiving an end of a biased slidable ratchet block; and iv. an integral actuator comprising:

1. a rod extending slidably through a first opening of said second set of three openings in said inner annular support panel of said rim assembly of said enclosure and further extending slidably through a barrel of said flip dog and configured to both pull said flip dog downward in said arcuate chamber and to travel upward without restriction from said barrel, wherein said barrel comprises a first opening of said first set of openings;

2. a T-handle extending across a bottom end of said rod;

3. a latch extending upward from said T-handle and configured to fit slidingly into a second opening of said second set of three openings.

12. The improvement of claim 11, wherein said arcuate chamber comprises at least one arcuate wall that extends from said inner annular support panel.

13. The improvement of claim 11, wherein each said flip dog of each said flip dog assembly of said plurality of flip dog assemblies comprises said barrel, a neck connecting said barrel to a flip dog foot, and a resilient portion attached to said flip dog foot.

14. The improvement of claim 11, each said flip dog assembly of said plurality of flip dog assemblies comprising an end piece of said rod distal said T-handle, comprising a clip receiver and a clip, wherein said clip is configured to prevent said rod from being withdrawn through said barrel of said flip dog of said plurality of said flip dog assemblies.

15. The improvement of claim 11, each said flip dog assembly of said plurality of flip dog assemblies comprising a ratchet spring assembly comprising:

a. said slidable ratchet block having a plurality of alignment bores in a proximal side;

b. an L-shaped base comprising vertical and horizontal portions;

c. a plurality of alignment rods, each extending horizontally from said vertical portion and slidingly received in an alignment bore of said plurality of alignment bores;

d. a plurality of coil springs, each surrounding one alignment rod of said plurality of alignment rods and configured to bias said ratchet block towards said chamber;

e. a second opening of said first set of three openings comprising a hole in said horizontal portion alignable with said second opening of said second set of three openings in an inner annular support panel of a rim assembly of said enclosure and configured to admit the passage of said latch when said slidable ratchet block is ratchetly engaged and said T-handle is stowed; and f. a plurality of arcuate downwardly pointing teeth on a distal side of said slidable ratchet block, wherein said downwardly pointed teeth are configured to ratchet with said upwardly pointed teeth.

16. The improvement of claim 15, each said flip dog assembly of said plurality of flip dog assemblies comprising a rigid cover for said ratchet spring assembly.

17. The improvement of claim 15, each said flip dog assembly of said plurality of flip dog assemblies comprising a third opening of said first set of openings further comprising a disengagement opening in a bottom surface of said slidable ratchet block aligned to said third opening of said second set of three openings in an inner annular support panel of a rim assembly of said enclosure when said slidable ratchet block is ratchetly engaged, and further aligned to a sloped wall inside said slidable ratchet block.

18. The improvement of claim 11, comprising a rim assembly comprising:

a. an annular rim operable as a jaw of a clamp;

b. an annular wall extending inside said annular rim;

c. said inner annular support panel extending inside said annular wall; and d. a plurality of said second sets of three openings in said inner annular support panel of a rim assembly of said enclosure, said plurality of said second sets of three openings equal in number to at least the number of said plurality of flip dog assemblies.

19. The improvement of claim 11, comprising a speaker can:

a. coupled to said inner annular support panel;

b. operable to retain a speaker; and c. having a plurality of indentations, each configured to accommodate one flip dog assembly of said plurality of flip dog assemblies.

20. An improved manually mountable ceiling speaker enclosure, the improvement comprising:

a. a rim assembly comprising:

i. an annular rim operable as a jaw of a clamp;

ii. an annular wall extending inside said annular rim; and iii. an inner annular support panel extending inside said annular wall; and iv. a plurality of second sets of three openings;

b. a speaker can:

i. supported on said inner annular support panel;

ii. operable to retain a speaker; and iii. having a plurality of indentations, each configured to accommodate a flip dog assembly;

c. a plurality of said flip dog assemblies, each comprising i. a first set of three openings alignable to said second set of three openings in said inner annular support panel of a rim assembly of said enclosure;

ii. a flip dog having a plurality of arcuate upward pointing teeth extending from a barrel of said flip dog;

iii. an arcuate chamber operable to slidingly receive said barrel and having an opening for receiving an end of a biased slidable ratchet block;

iv. an integral actuator comprising:

1. a rod extending slidably through a first opening of said second set of three openings in said inner annular support panel of said rim assembly of said enclosure and further extending slidably through said barrel and configured to both pull said flip dog downward in said arcuate chamber and to travel upward without restriction from said barrel, wherein said barrel comprises a first opening of said first set of three openings;

2. a T-handle extending across a bottom end of said rod;

3. a latch extending upward from said T-handle and configured to fit slidingly into a second opening of said second set of three openings in said inner annular support panel of said rim assembly of said enclosure;

v. a ratchet spring assembly comprising:

1. said slidable ratchet block having a plurality of alignment bores in a proximal side;

2. an L-shaped base comprising vertical and horizontal portions;

3. a plurality of alignment rods, each extending horizontally from said vertical portion and slidingly received in an alignment bore of said plurality of alignment bores;

4. a plurality of coil springs, each surrounding one alignment rod of said plurality of alignment rods and configured to bias said ratchet block towards said chamber;

5. a second opening of said first set of three openings comprising a hole in said horizontal portion alignable with said second opening of said second set of three openings in an inner annular support panel of a rim assembly of said enclosure and configured to admit the passage of said latch when said slidable ratchet block is ratchetly engaged;

6. a plurality of arcuate downwardly pointing teeth on a distal side of said slidable ratchet block, wherein said downwardly pointed teeth are configured to ratchetly engage with said upwardly pointed teeth; and 7. a third opening of said first set of openings further comprising a disengagement opening in a bottom surface of said slidable ratchet block aligned to said third opening of said second set of three openings in an inner annular support panel of a rim assembly of said enclosure when said slidable ratchet block is ratchetly engaged, and said third opening of said first set of openings is further aligned to a sloped wall inside said slidable ratchet block.

* * * * *